US012715436B2

(12) United States Patent
Jayawardana et al.

(10) Patent No.: US 12,715,436 B2
(45) Date of Patent: Aug. 25, 2026

(54) SYSTEMS AND METHODS FOR VEHICLES NAVIGATING ROADS USING A CONTROL MODEL TRAINED WITH RESIDUAL POLICIES

(71) Applicant: Toyota Motor Engineering & Manufacturing North America, Inc., Plano, TX (US)

(72) Inventors: Vindula M. Jayawardana, Cambridge, MA (US); Yashar Zeiynali Farid, San Jose, CA (US); Kentaro Oguchi, Mountain View, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 154 days.

(21) Appl. No.: 18/507,458

(22) Filed: Nov. 13, 2023

(65) Prior Publication Data

US 2025/0083672 A1 Mar. 13, 2025

Related U.S. Application Data

(60) Provisional application No. 63/582,269, filed on Sep. 13, 2023.

(51) Int. Cl.
*B60W 30/14* (2006.01)
*G05B 13/02* (2006.01)

(52) U.S. Cl.
CPC ....... *B60W 30/143* (2013.01); *G05B 13/0265* (2013.01); *B60W 2555/20* (2020.02);
(Continued)

(58) Field of Classification Search
CPC .......... B60W 30/143; B60W 2556/45; B60W 2555/20; B60W 2720/10; B60W 2720/106; G05B 13/0265
See application file for complete search history.

(56) References Cited

U.S. PATENT DOCUMENTS 7,274,306 B2 9/2007 Publicover
9,812,009 B2 11/2017 Publicover
(Continued)

FOREIGN PATENT DOCUMENTS

CN 114261392 A 4/2022
CN 116061971 A 5/2023

OTHER PUBLICATIONS

Yuan, Mingfeng, et al., From Naturalistic Traffic Data to Learning-Based Driving Policy: A Sim-to-Real Study, Aug. 22, 2023, IEEE (Year: 2023).*

(Continued)

*Primary Examiner* — Kito R Robinson
*Assistant Examiner* — Erin Marie Hartmann
(74) *Attorney, Agent, or Firm* — Christopher G. Darrow; Darrow Mustafa PC

(57) ABSTRACT

Systems, methods, and other embodiments described herein relate to an automated vehicle (AV) navigating on roads with a control model trained using residual policies for reducing error. In one embodiment, a method includes generating a generic policy for a control model used to navigate a road having multiple agents with traffic data acquired, the generic policy applying to general traffic scenarios associated with the road. The method also includes training a task policy with reinforcement learning a plurality of residual functions for error reduction of the generic policy, the residual functions factoring parameters about the multiple agents and specific traffic scenarios. The method also includes communicating the generic policy, the task policy for error reduc- (Continued)

tion, and a domain distribution learned by comparing simulated data with the traffic data to a vehicle.

20 Claims, 7 Drawing Sheets

(52) U.S. Cl.
CPC ..... *B60W 2556/45* (2020.02); *B60W 2720/10* (2013.01); *B60W 2720/106* (2013.01)

(56) References Cited

U.S. PATENT DOCUMENTS

| | | | | |
|---|---|---|---|---|
| 2023/0196749 | A1 | 6/2023 | Mahendran et al. | |
| 2023/0303123 | A1 * | 9/2023 | Sadek .................. | G06N 3/0985 |

OTHER PUBLICATIONS

Likmeta, Amarildo, et al., Combining reinforcement learning with rule-based controllers for transparent and general decision-making in autonomous driving, Jun. 23, 2020, Elsevier, Robotics and Autonomous Systems vol. 131 (Year: 2020).*

Chochilouros et al. "C-V2X Communications for the Support of a Green Light Optimized Speed Advisory (GLOSA) Use Case." Journal of Telecommunications and Information Technology 2 (2021): 14 pages.

Altan et al. "GlidePath: Eco-friendly automated approach and departure at signalized intersections." IEEE Transactions on Intelligent Vehicles, Dec. 2017, 13 pages, vol. 2 No. 4.

Li et al. "HARL: A novel hierachical adversary reinforcement learning for autonoumous intersection management." arXiv preprint arXiv:2205.02428, 2022, 15 pages.

He et al. "Adaptive Decision Making at the Intersection for Autonomous Vehicles Based on Skill Discovery." 2022 IEEE 25th International Conference on Intelligent Transportation Systems (ITSC). IEEE, 2022, 6 pages.

Jiang et al. "Eco-driving for Electric Connected Vehicles at Signalized Intersections: A Parameterized Reinforcement Learning approach." arXiv preprint arXiv:2206.12065, 2022, 27 pages.

Yang et al. "A hierarchical behavior prediction framework at signalized intersections." 2021 IEEE International Intelligent Transportation Systems Conference (ITSC). IEEE, 2021, 7 pages.

Li et al. "D-HAL: Distributed Hierarchical Adversarial Learning for Multi-Agent Interaction in Autonomous Intersection Management." arXiv preprint arXiv:2303.02630, 2023, 17 pages.

Yao et al. "A trajectory smoothing method at signalized intersection based on individualized variable speed limits with location optimization." Transportation Research Part D: Transport and Environment, Jul. 2018, 26 pages, vol. 62.

* cited by examiner

SYSTEMS AND METHODS FOR VEHICLES NAVIGATING ROADS USING A CONTROL MODEL TRAINED WITH RESIDUAL POLICIES

CROSS-REFERENCE TO RELATED APPLICATIONS

This application claims the benefit of U.S. Provisional Application No. 63/582,269, filed on, Sep. 13, 2023, which is herein incorporated by reference in its entirety.

TECHNICAL FIELD

The subject matter described herein relates, in general, to navigating roads by automated vehicles (AV), and, more particularly, to an AV navigating on roads with a control model trained using residual policies for reducing error.

BACKGROUND

Automated vehicles (AV) are rapidly becoming more commonplace for mitigating traffic congestion, curbing emissions, and improving traffic flow. AVs may be equipped with sensors generating data that facilitate perceiving other vehicles, obstacles, pedestrians, and additional aspects of a surrounding environment. For example, a vehicle may be equipped with a light detection and ranging (LIDAR) sensor that uses light to scan the surrounding environment, while logic associated with the LIDAR analyzes acquired data to detect object presence and other features of the surrounding environment. In further examples, additional/alternative sensors such as cameras may be implemented to acquire information about the surrounding environment from which a system derives awareness about aspects of the surrounding environment. This sensor data can be useful in various circumstances for improving perceptions of the surrounding environment so that systems such as automated driving systems (ADS) can perceive the noted aspects and accurately navigate roads.

Moreover, AVs in real environments encounter difficulties navigating complex vehicle interactions, diverse roadway geometries, traffic lights, stop signs, and so on. For example, traffic scenarios involving AVs that are grouped (e.g., cooperative control) encounter unconnected vehicles at intersections causing challenges, such as lane changes due to collision risk. Furthermore, AVs may implement model-based controllers (e.g., model predictive control (MPC)) that rely upon assumptions for a specific scenario and an environment model that is known. If the underlying assumptions are untrue, these models generate results having errors and suboptimal solutions. As such, model-based controllers that are otherwise efficient and reliable become a liability under atypical and rapidly changing traffic scenarios. In one approach, AVs implement machine learning (ML) models for navigating complex tasks. However, ML models may be unable at adapting to new driving scenarios, atypical intersections, and so on. For instance, an ML model trained without snow data underperforms vehicle handling and control during weather conditions having snow, thereby increasing inefficiencies. Therefore, AVs navigating traffic scenarios and intersections that are complex using models for control encounter inefficiencies and safety risks.

SUMMARY

In one embodiment, example systems and methods relate to an automated vehicle (AV) navigating on roads with a control model trained using residual policies for reducing error. In various implementations, systems using control models (e.g., model predictive control (MPC), a neural network (NN), etc.) to navigate traffic scenarios and intersections that are complex encounter difficulties from irregularities. For example, eco-maneuvers at signalized intersections (e.g., a green light optimized speed advisory (GLOSA) function) are systems that adjust speed using signal timing at intersections so that grouped vehicles (e.g., cooperative adaptive cruise control (CACC) vehicles) pass efficiently and safely. However, data about signal timing may be insufficient in complex traffic conditions without factoring traffic queues, weather conditions, operator behavior, and so on. Furthermore, systems may rely on AV as Lagrangian actuators for traffic control rather than actuators having fixed-location (e.g., traffic signals) by influencing human-driven vehicles through mimicking vehicle dynamics. Also known as Lagrangian control, these AVs complicate traffic scenarios from executing irregular maneuvers for efficiency that confuse surrounding traffic. As such, in one approach, reinforcement learning (RL) that is model-free can assist AVs with navigating complex traffic scenarios and intersections. Still, learning control policies from RL that generalize traffic scenarios involving multiple agents is difficult, especially for vehicles implementing Lagrangian control.

Therefore, in one embodiment, a planning system trains a policy for a control model to identify maneuvers by an AV that are energy-efficient for mixed traffic (i.e., including AVs and non-AVs). In particular, the planning system forms a hierarchical arrangement for control with a generic policy and a task policy that adapts to various traffic scenarios, roads, and intersection configurations having multiple agents. Here, the generic policy may be utilized by a data-driven model, an adaptive cruise control (ACC) model, a MPC model, a heuristic control, and so on for outputting motion commands about typical scenarios. The task policy is a model that reduces errors of the motion commands from the generic policy. In one approach, the planning system trains the task policy with RL from residual functions that factor parameters about the multiple agents, thereby having a framework for multi-residual task learning (MRTL). For example, the MRTL for multi-agents decomposes task scenarios into parts that are efficiently solved by the RL using control functions and the residual functions. As such, a complete policy for a task scenario becomes the superposition of two control inputs. Once training is completed, the planning system communicates the generic policy and the task policy to a vehicle for implementing with the control model. Accordingly, the planning system trains the control model with a generic framework through MRTL that generalizes RL computations for efficiency while improving the accuracy of the control model with residual functions adjusting for multi-agent encounters.

In one embodiment, a planning system involving an AV navigating on roads with a control model trained using residual policies for reducing error is disclosed. The planning system includes a memory including instructions that, when executed by a processor, cause the processor to generate a generic policy for a control model used to navigate a road having multiple agents with traffic data acquired, the generic policy applying to general traffic scenarios associated with the road. The instructions also include instructions to train a task policy with reinforcement learning a plurality of residual functions for error reduction of the generic policy, the residual functions factoring parameters about the multiple agents and specific traffic scenarios. The instructions also include instructions to communicate the generic policy, the task policy for error reduction, and a domain distribution learned by comparing simulated data with the traffic data to a vehicle.

In one embodiment, a non-transitory computer-readable medium having an AV navigating on roads with a control model trained using residual policies for reducing error and including instructions that when executed by a processor cause the processor to perform one or more functions is disclosed. The instructions include instructions to generate a generic policy for a control model used to navigate a road having multiple agents with traffic data acquired, the generic policy applying to general traffic scenarios associated with the road. The instructions also include instructions to train a task policy with reinforcement learning a plurality of residual functions for error reduction of the generic policy, the residual functions factoring parameters about the multiple agents and specific traffic scenarios. The instructions also include instructions to communicate the generic policy, the task policy for error reduction, and a domain distribution learned by comparing simulated data with the traffic data to a vehicle.

In one embodiment, a method for an AV navigating on roads with a control model trained using residual policies for reducing error is disclosed. In one embodiment, the method includes generating a generic policy for a control model used to navigate a road having multiple agents with traffic data acquired, the generic policy applying to general traffic scenarios associated with the road. The method also includes training a task policy with reinforcement learning a plurality of residual functions for error reduction of the generic policy, the residual functions factoring parameters about the multiple agents and specific traffic scenarios. The method also includes communicating the generic policy, the task policy for error reduction, and a domain distribution learned by comparing simulated data with the traffic data to a vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
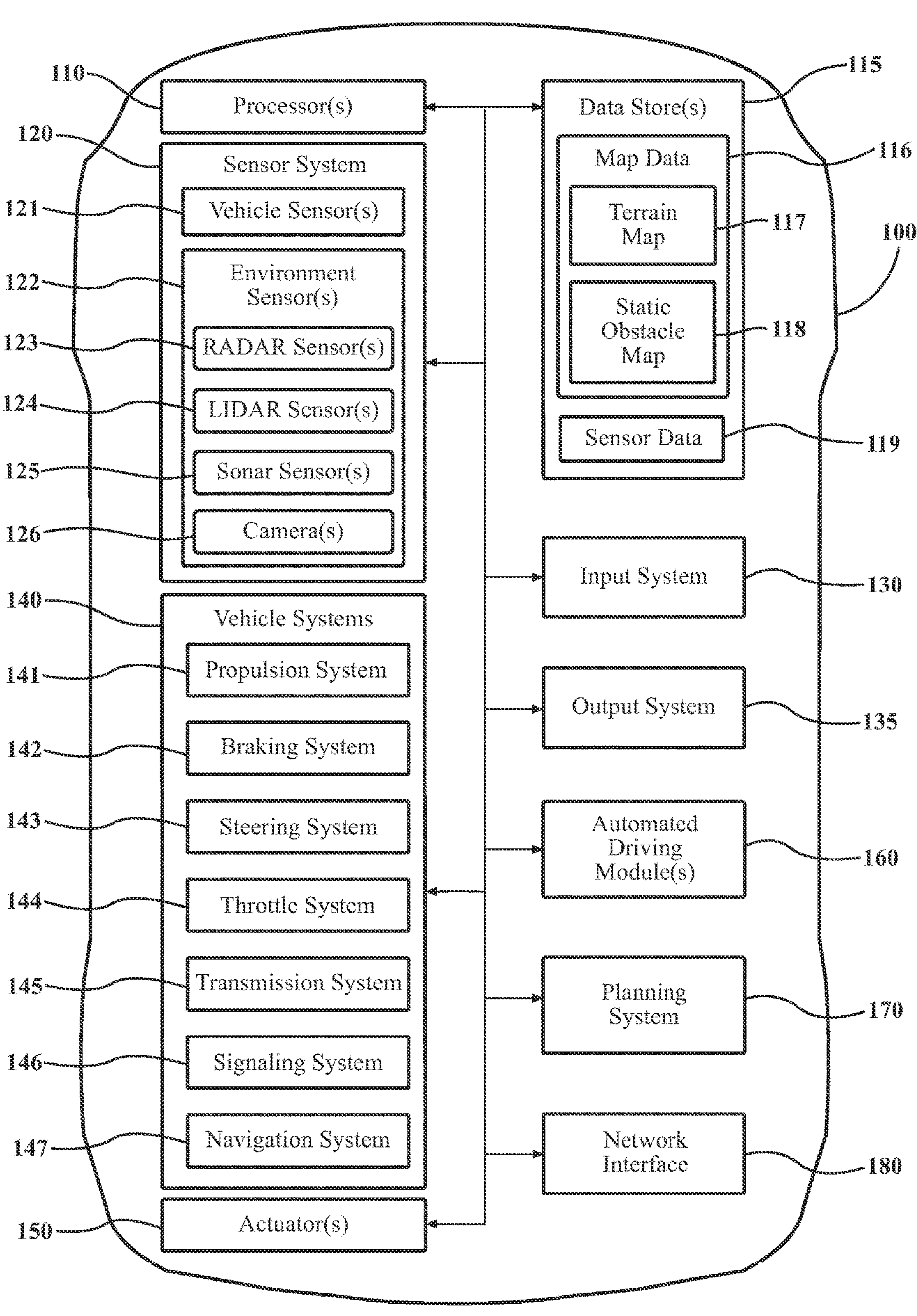
FIG. 1 illustrates one embodiment of a vehicle within which systems and methods disclosed herein may be implemented.

Systems, methods, and other embodiments including an automated vehicle (AV) navigating on roads with a control model trained using residual policies for reducing error are disclosed herein. In various implementations, systems utilizing reinforcement learning (RL) train a control model without predefined dynamics, thereby having a model-free approach that mitigates model-based limitations and adapting the control model for driving scenarios that vary. In particular, RL specifies control objectives indirectly within a reward function rather than control actions that are explicit for attaining certain objectives. However, RL may encounter difficulties with driving environments that are non-deterministic and certain traffic scenarios, such as Lagrangian control where AVs act as Lagrangian actuators for traffic control rather than actuators having fixed-location (e.g., traffic signals). In one approach, RL uses residual learning for complex and atypical tasks involving a single-agent. Still, residual learning for a control model lacks accuracy for multi-agent scenarios, such as cooperative control and Lagrangian control.

Therefore, in one embodiment, a planning system generalizes training of a control model (e.g., model predictive control (MPC), a neural network (NN), etc.) using RL across driving scenarios that vary, including those induced by Lagrangian control. In particular, the planning system trains with multi-residual task learning (MRTL) having a generic framework that synergizes RL (e.g., deep RL (DRL)) strengths and task estimation for generalizable control. In one approach, the MRTL decomposes driving scenarios into parts solved by a function (e.g., model-based control, heuristics, etc.) and residuals that improve computational efficiency for RL of the control model. As such, the planning system reduces error for the control model with task synthesis involving a generic policy and a task policy. Here, the generic policy applies to traffic scenarios generally while the planning system trains the task policy with RL of residual functions for error reduction of the generic policy through factoring parameters about multiple agents and specific traffic scenarios. In this way, MRTL reduces error of a generic policy implemented by the control model through learning the task policy with generalization while increasing training efficiency.

Moreover, in various implementations, the planning system learns the task policy with a Markov decision process (MDP) that segments vehicle actions into different components (e.g., tasks, task policies, etc.) for the generic policy and the residual functions. Here, the MDP factors the multiple agents and the specific traffic scenarios that trains the task policy to reduce errors from the generic policy. Furthermore, another component augments the generic policy as an additional enhancement to accuracy. In one approach, the planning system learns an intermediate policy for the generic policy that increases accuracy when safety metrics are unmet. For example, the intermediate policy factors lane geometries about an intersection that alters a complete task to decelerate since the generic policy excluded factoring a wet road reducing stopping distances. Accordingly, the planning system trains the control model with MRTL that generalizes RL computations by including a task policy for residual errors that increases efficiency and improving accuracy for multi-agent encounters.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, a planning system 170 uses road-side units (RSU), consumer electronics (CE), mobile devices, robots, drones, and so on that benefit from the functionality discussed herein associated with navigating through traffic by an AV with a control model trained using residual policies for reducing error. As further explained below, the planning system 170 may have parts for the control model that are trained remotely with traffic data acquired from the vehicle 100. The trained parts and the traffic data can be communicated over the network interface 180 for implementing the control model by the vehicle 100. In particular, the network interface 180 can utilize a wireless or wired connection through one of a V2X protocol (e.g., cellular V2X), a modem of the vehicle 100, dedicated short-range communications (DSRC) protocol, and so on and receive one or more of the trained parts.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a planning system 170 that is implemented to perform methods and other functions as disclosed herein relating to navigating through traffic by an AV with a control model trained using residual policies for reducing error. As will be discussed in greater detail subsequently, the planning system 170, in various embodiments, is implemented partially within the vehicle 100, and as a cloud-based service for training.

Figure 2:
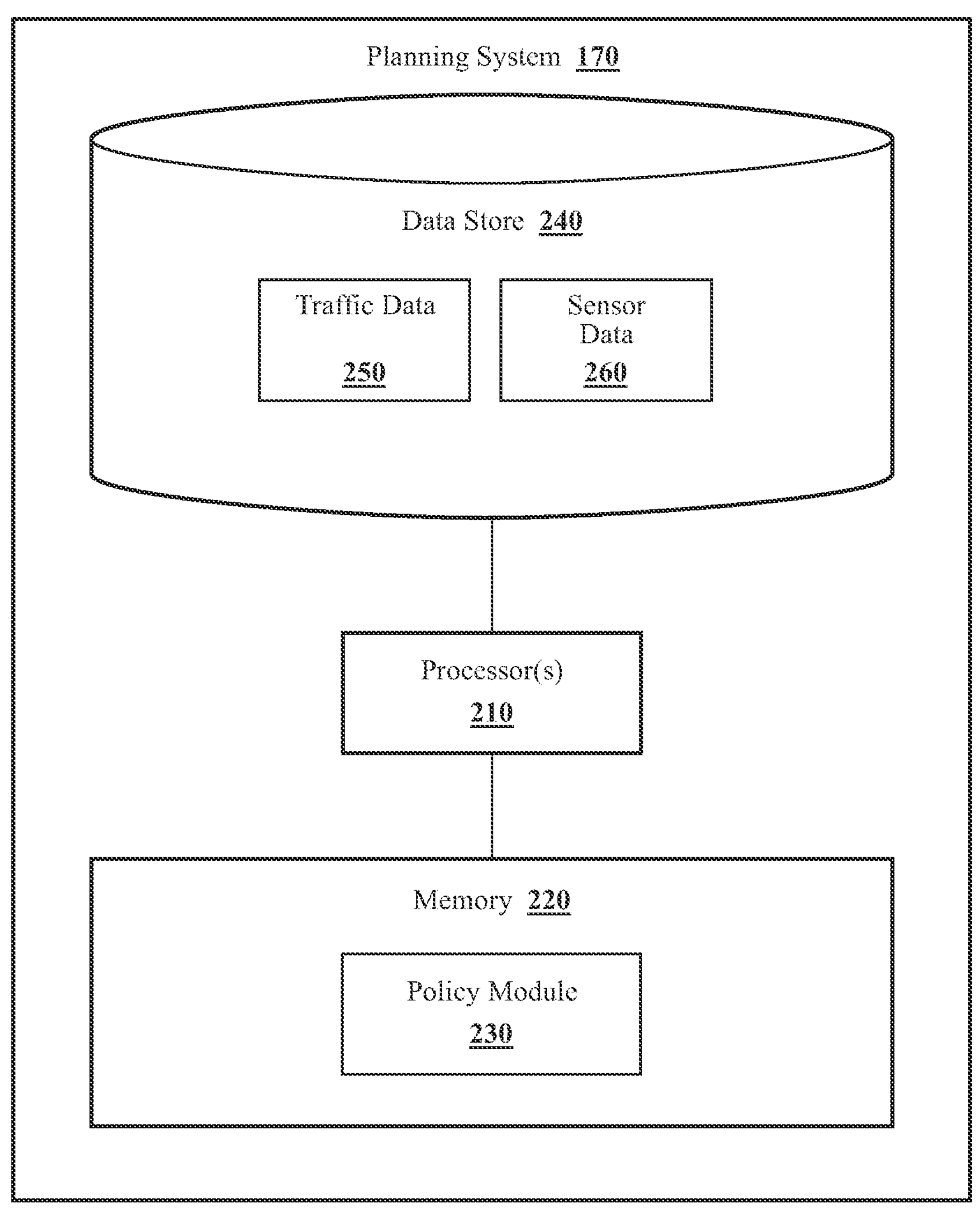
FIG. 2 illustrates one embodiment of a planning system that is associated with navigating a road by an automated vehicle (AV) with a control model trained using residual policies for reducing error.

With reference to FIG. 2, one embodiment of the planning system 170 is further illustrated. The planning system 170 is shown as including a processor(s) 210 that may be associated with from the vehicle 100 of FIG. 1. Accordingly, the processor(s) 210 may be a part of the planning system 170, the planning system 170 may include a separate processor from the processor(s) 110 of the vehicle 100, or the planning system 170 may access the processor(s) 210 through a data bus or another communication path. In one embodiment, the planning system 170 includes a memory 220 that stores a policy module 230. The memory 220 is a random-access memory (RAM), a read-only memory (ROM), a hard-disk drive, a flash memory, or other suitable memory for storing the policy module 230. The policy module 230 is, for example, computer-readable instructions that when executed by the processor(s) 210 cause the processor(s) 210 to perform the various functions disclosed herein.

With reference to FIG. 2, the policy module 230 generally includes instructions that function to control the processor(s) 210 to receive data inputs from one or more sensors of the vehicle 100, such as over the network interface 180. The inputs are, in one embodiment, observations of one or more objects in an environment proximate to the vehicle 100 and/or other aspects about the surroundings. As provided for herein, the policy module 230, in one embodiment, acquires sensor data 260 that includes at least camera images. In further arrangements, the policy module 230 acquires the sensor data 260 from further sensors such as radar sensors 123, LIDAR sensors 124, and other sensors as may be suitable for identifying vehicles and locations of the vehicles.

Accordingly, the policy module 230, in one embodiment, controls the respective sensors to provide the data inputs in the form of the sensor data 260. Additionally, while the policy module 230 is discussed as controlling the various sensors to provide the sensor data 260, in one or more embodiments, the policy module 230 can employ other techniques to acquire the sensor data 260 that are either active or passive. For example, the policy module 230 may passively sniff the sensor data 260 from a stream of electronic information provided by the various sensors to further components within the vehicle 100. Moreover, the policy module 230 can undertake various approaches to fuse data from multiple sensors when providing the sensor data 260 and/or from sensor data acquired over a wireless communication link. Thus, the sensor data 260, in one embodiment, represents a combination of perceptions acquired from multiple sensors.

Furthermore, in one embodiment, the planning system 170 includes a data store 240. In one embodiment, the data store 240 is a database. The database is, in one embodiment, an electronic data structure stored in the memory 220 or another data store and that is configured with routines that can be executed by the processor(s) 210 for analyzing stored data, providing stored data, organizing stored data, and so on. Thus, in one embodiment, the data store 240 stores data used by the policy module 230 in executing various functions. In one embodiment, the data store 240 includes the sensor data 260 along with, for example, metadata that characterize various aspects of the sensor data 260. For example, the metadata can include location coordinates (e.g., longitude and latitude), relative map coordinates or tile identifiers, time/date stamps from when the separate sensor data 260 was generated, and so on. In one embodiment, the data store 240 further includes the traffic data 250. For example, a server (e.g., a cloud server, edge server, RSU, etc.) acquires the traffic data 250 from the vehicle 100 over the network interface 180. The traffic data 250 can include parameters associated with any one of road configurations, intersection configurations, intersection types, lane geometry (e.g., width, curvature, etc.), a number of lanes, a lane bound, bucket availability (e.g., left-turn, right-turn, etc.), signal timing (e.g., phases, durations, permissive left-turn, permitted left-turn, etc.), operator behavior, weather conditions, traffic demand, and so on. The traffic data 250 may be associated with a road, highway, intersection, and so on. The planning system 170 can also enhance training by acquiring signal timing data (SPaT) for a signalized intersection associated with a road that identifies signal protocols (e.g., time-to-green), emergency signals, and so on.

Figure 3:
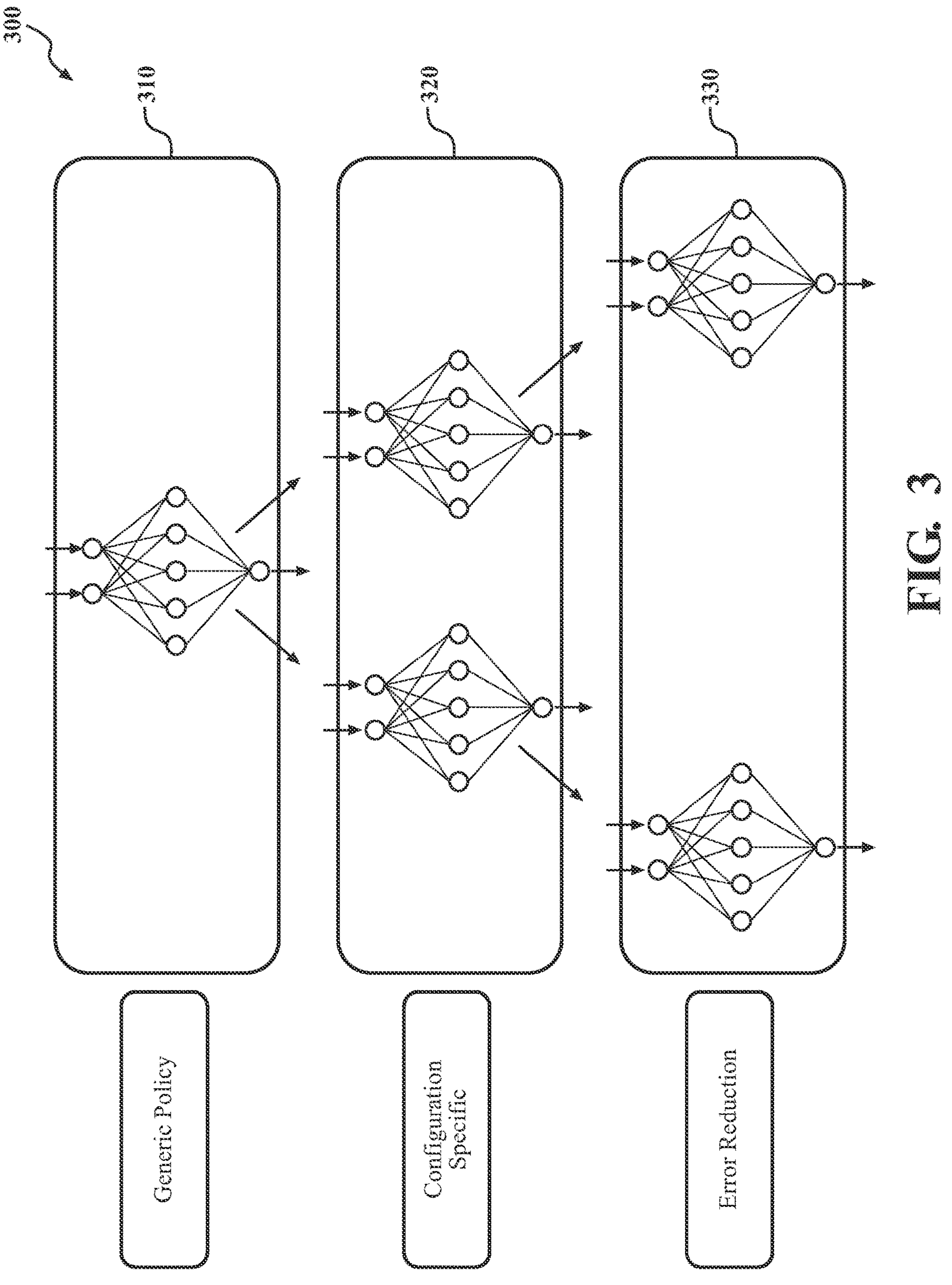
FIG. 3 illustrates one embodiment of the planning system training the control model using generic and residual policies in a hierarchical arrangement.

Turning now to FIG. 3, one embodiment of the planning system 170 training the control model using generic and residual policies in a hierarchical arrangement 300 is illustrated. Here, the policy module 230 includes instructions that cause the processor 210 to execute the control model with a generic policy 310. In various implementations, the control model is any one of a MPC model, a NN, a data-driven model, an adaptive cruise control (ACC) model, a heuristic control, an eco-Lagrangian control model, and so on that outputs motion commands as navigation actions for the vehicle 100. The control model may be fixed while factoring driving scenarios with the generic policy 310. In one approach, the generic policy 310 is a function that outputs acceleration and speed for basic tasks by the vehicle 100 on a road without factoring parameters from the traffic data 250. Furthermore, the planning system 170 can share through a cloud system the generic policy 310 to the vehicle 100 for applying toward most road configurations, traffic scenarios, weather conditions, and so on. A policy may be a function accepting an input and outputting an optimal action (e.g., acceleration, maneuver, braking, etc.). In one approach, the planning system 170 trains and maintains the control model on the server and shares updates with the vehicle 100 through the network interface 180. For example, the updates follow a time interval (e.g., six months, two months, etc.).

Moreover, the configuration specific 320 layer is a component within the hierarchical arrangement 300 that the planning system 170 may utilize to reduce errors of the generic policy 310 caused by different road and intersection configurations. Here, a model reduces error for the generic policy 310 and identifies an intermediate policy using specialized controllers that may be model-based controllers, ML-based controllers, data-driven models, and so on. For example, the planning system 170 trains the configuration specific 320 layer with policies for 3-leg, 4-leg, and so on intersection configurations that are complex using outputs from specialized controllers in a simulator that refine results for the generic policy 310. In one approach, a control model skips processing by the configuration specific 320 layer and identifies the intermediate policy when the generic policy 310 has satisfactory policies, such as for various intersection configurations. In another approach, the planning system 170 trains and maintains the configuration specific 320 layer on the server and shares updates with the vehicle 100 through the network interface 180. For example, the updates are scheduled with a time interval (e.g., six months, two months, etc.). Accordingly, the planning system 170 trains the generic policy for robustness with the configuration specific 320 layer, particularly involving complex and atypical intersections.

Concerning the error reduction 330 layer, the planning system 170 reduces the gap between the generic policy 310 and the optimal policy in complex tasks (e.g., real traffic, weather, multi-agents, etc.) by training a task policy for multi-agent scenarios that factor the traffic data 250. Here, the error reduction 330 layer involves training a task policy to generate optimal and specialized solutions toward various intersections involving different operator behaviors, weather conditions, atypical configurations, demand levels, SPAT, and so on. The gap may exist since the generic policy 310 layer can forego factoring conditions (e.g., weather), thereby leading to sub-optimal actions. As further explained below, training the task policy to reduce error may involve RL learning residual functions for the generic policy 310 associated with the control model using the traffic data 250, simulated data, and virtual agents (e.g., vehicles) offline on the server. In one approach, the planning system 170 trains the error reduction 330 layer on the server and shares updates with the vehicle 100. For example, the updates are scheduled with a time interval (e.g., six months, two months, etc.) where the vehicle 100 receives the generic policy 310 from upper layers and the task policy from lower layers through the network interface 180, thereby reducing error and decreasing the optimality gap associated with specific road types.

Figure 4A:
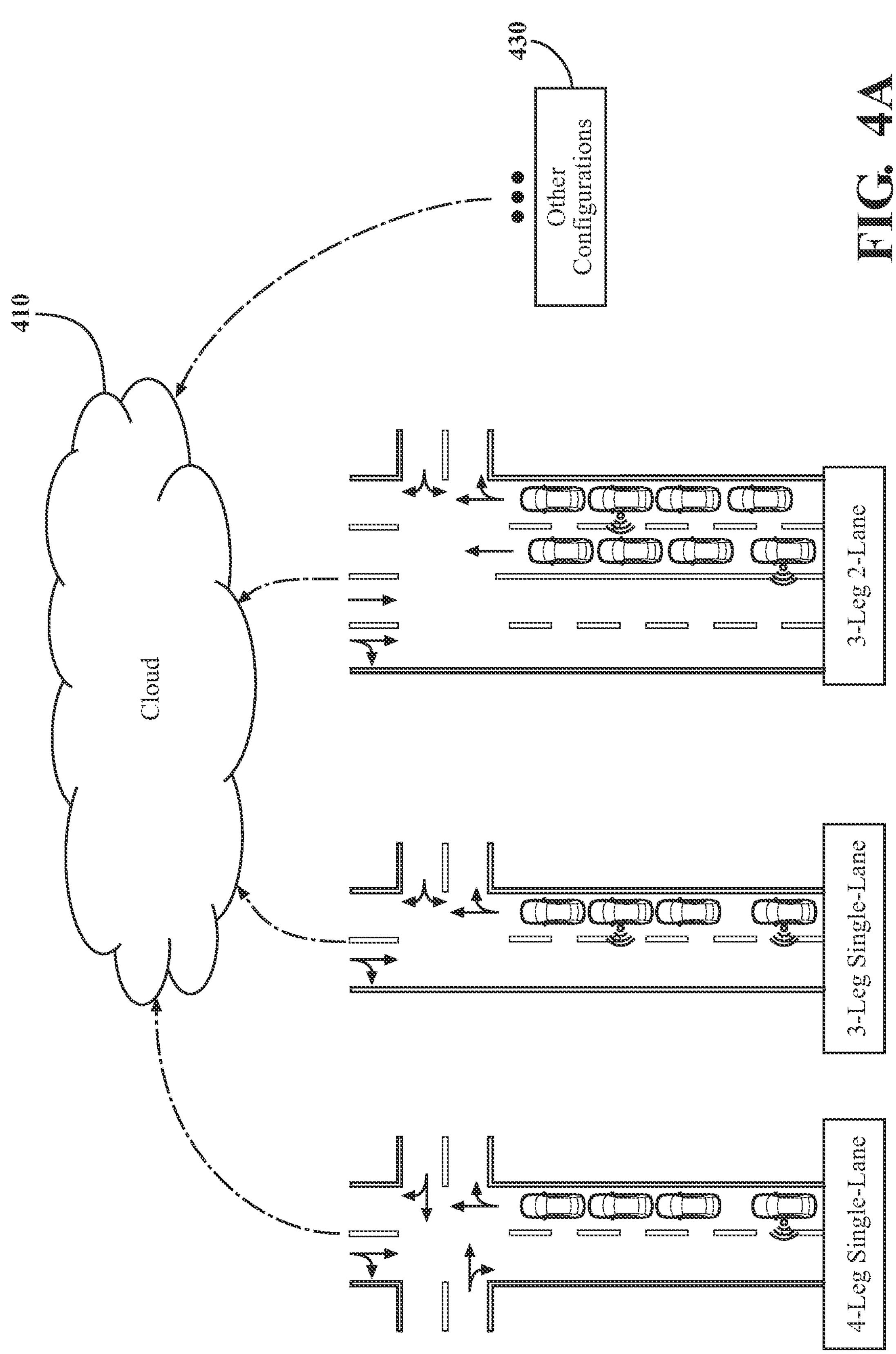
FIGS. 4A and 4B illustrate an example of a control model estimating tasks according to the road configurations through cloud-based training.
Figure 4B:
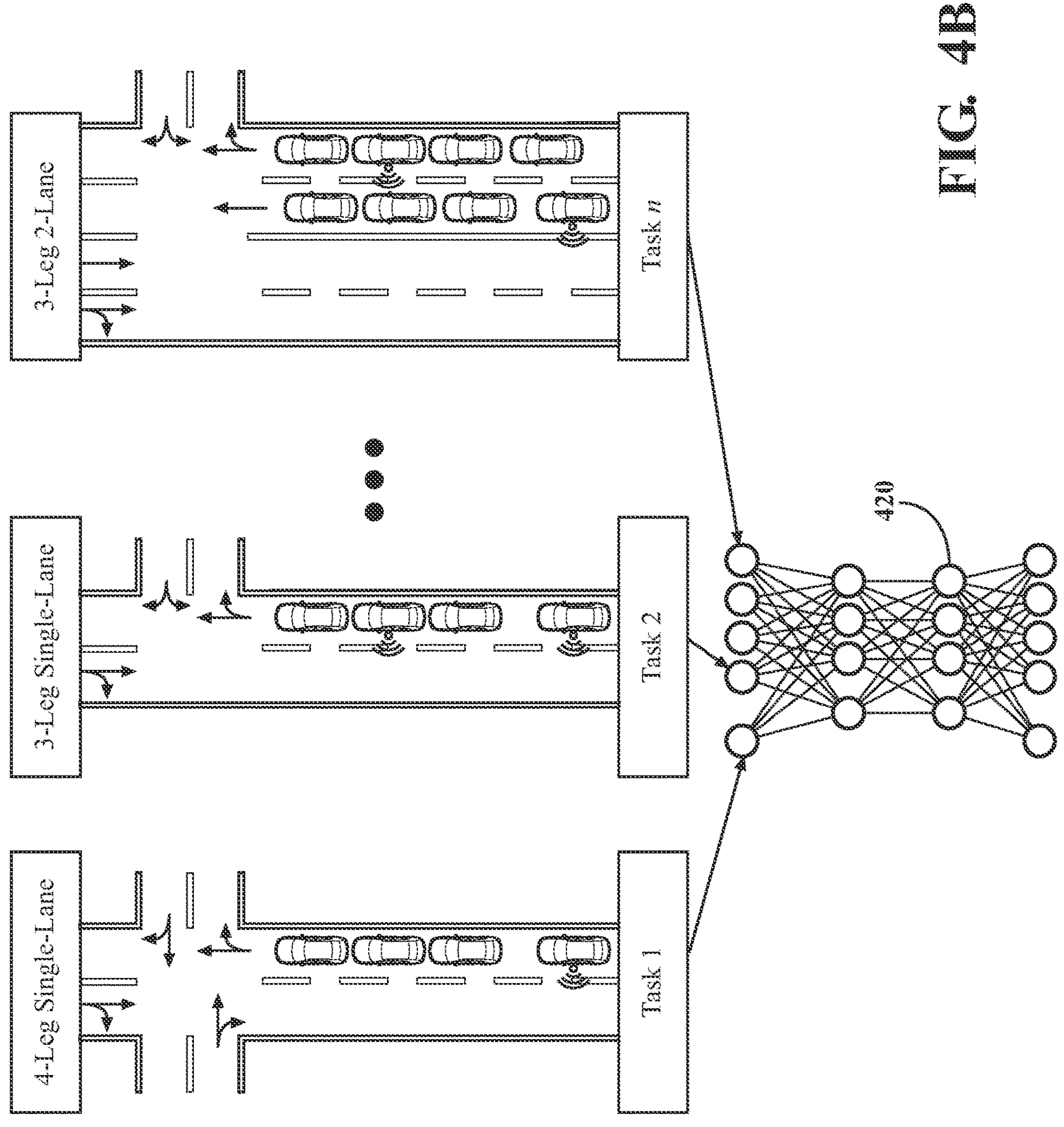

Regarding further details on cloud-based training, FIGS. 4A and 4B illustrate an example of a control model estimating tasks according to road configurations through cloud-based training. Although FIG. 4A illustrates cloud-based training, the planning system 170 can train agents within simulated environments. Here, the planning system 170 may include the cloud system 410 that learns a traffic model with the learning network 420 through acquiring the traffic data 250 about 4-leg single-lane, 3-leg single-lane, 3-leg 2-lane, and so on lane configurations. The other configurations 430 may include additional data about lane configurations that are atypical or uncommon. Furthermore, the cloud system 410 acquires domain distributions about actual vehicle actions involving lane configurations that are site-specific, thereby improving the accuracy of the generic policy 310 and MRTL. For example, the domain distribution factors differences between operator behavior at a geographic location from simulated data and the traffic data 250. In particular, optimized $Task_1$, $Task_2$, . . . . Task, is learned and associated with 4-leg single-lane, 3-leg single-lane, 3-leg 2-lane, respectively. The vehicle 100 can use the traffic model and the domain distributions to identify the optimal action (e.g., acceleration, maneuver, braking, etc.) for learning-based control, MPC, and so on. Therefore, the cloud system 410 learns the generic policy 310 along with the traffic model and shares the generic policy 310 and the traffic model with the vehicle 100 over the network interface 180.

In one approach, the cloud system 410 periodically (e.g., every month) shares the traffic model learned, the generic policy 310, domain distributions, and so on with the vehicle 100 through the network interface 180. This task reduces error and decreases the optimality gap in a specific intersection, thereby improving performance of control models. In various implementations, the vehicle 100 processes the traffic model to identify a base solution using MPC, a data-driven model, and so on for control. Furthermore, the cloud system 410 can communicate the generic policy 310 for the vehicle 100 to compute a base solution. In this way, the generic policy 310 is kept current through updates of the base solution. The vehicle 100 uses the received policies and domain distributions to compute improved actions (e.g., acceleration) given input data (e.g., current position, speed, signal timings, etc.). Accordingly, the cloud system 410 can train generic policies and implement MRTL that improves accuracy for control models and share the generic policy, MRTL, and domain distributions with the vehicle 100.

Figure 5:
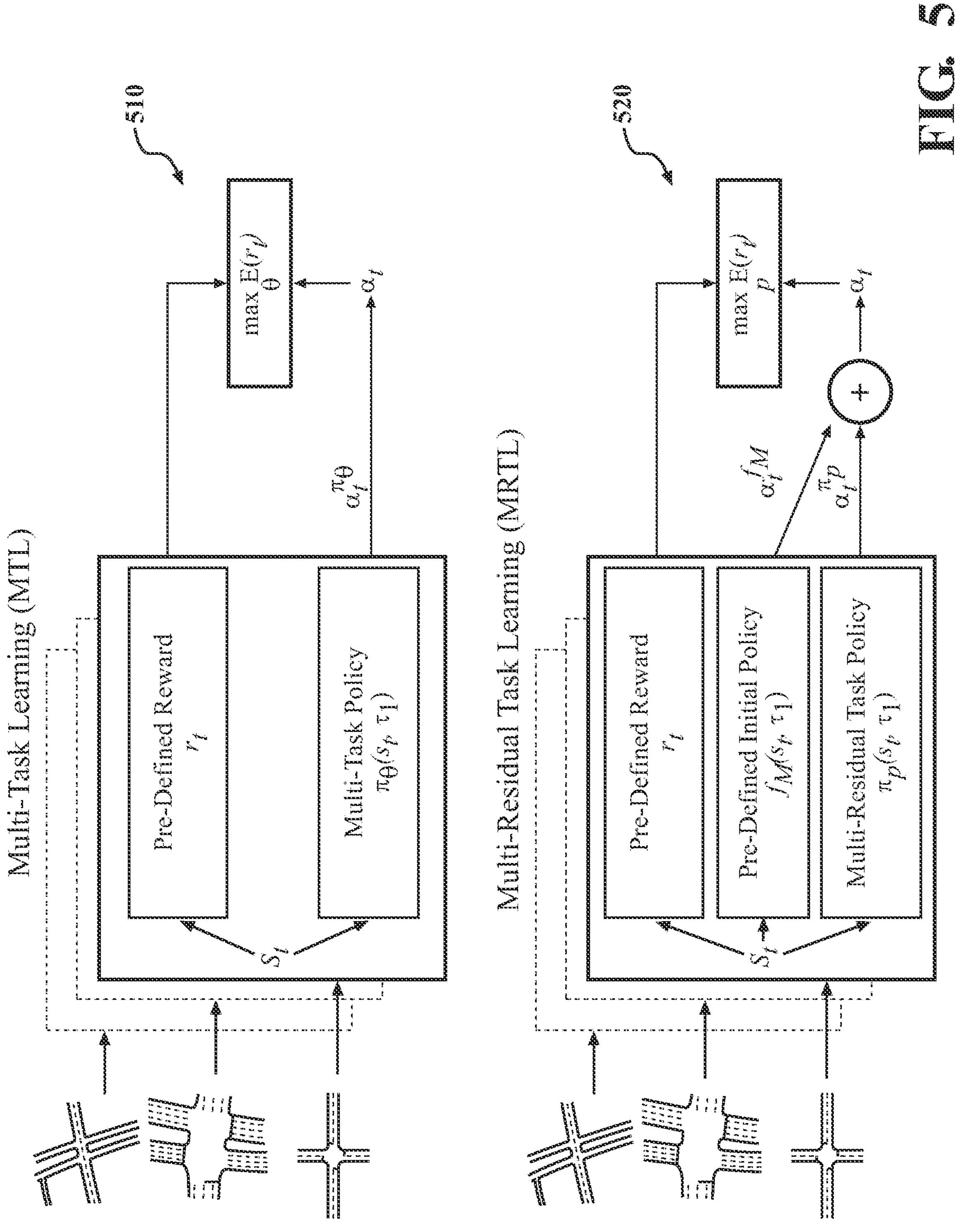
FIG. 5 illustrates an example of a comparison between multi-task learning (MTL) and multi-residual task learning (MRTL) involving various road configurations.

Turning to FIG. 5, an example of a comparison between multi-task learning (MTL) 510 and MRTL 520 involving various road configurations is illustrated. Here, the planning system 170 uses RL to train policies with residual learning for outputting vehicle actions (e.g., acceleration) for smoother trips and reduced energy consumption. In various implementations, the MRTL 520 treats a traffic scenario as a varying task involving multi-agents and follows centralized training and decentralized execution (CTDE) through deep RL (DRL). In RL, an agent learns a control policy by interacting with an environment that can be modeled as a Markov Decision Process (MDP). For example, a MDP is denoted as $M=\langle \mathcal{S}, \mathcal{A}, p, r, \rho, \gamma\rangle$, where $\mathcal{S}$ represents a set of states (e.g., position, velocity, acceleration, dynamics of the adjacent vehicles, context vector, etc.) and $\mathcal{A}$ represents possible actions over certain dimensions and spaces. Regarding other functions, $p(s_{t+1}|s_t, \alpha_t)$ denotes the transition probability from a current state $s_t$ to a next state $s_{t+1}$ upon taking action at over a time horizon t, the reward (e.g., sum of a power request and energy consumption) for action at $\alpha_t$ state $s_t$ is $r(s_t, \alpha_t)\in\mathbb{R}$, and a distribution over the initial states is $\rho$. In addition, $\gamma\in[0,1]$ is a discounting factor that balances immediate and future rewards. Given the MDP, the planning system 170 searches for an optimal policy $\pi^*:\mathcal{S}\rightarrow\mathcal{A}$ that maximizes the cumulative discounted reward expected over the MDP:

$$\pi^*(s)=\underset{\pi}{\operatorname{argmax}}\mathbb{E}\left[\sum_{t=0}^{\infty}\gamma^t r(s_t, a_t)\,\middle|\, s_0, \pi\right]. \quad \text{Equation (1)}$$

Compared to the MTL 510, the MRTL 520 extends the single-MDP (i.e., single task, scenario, etc.) RL to multiple-MDPs (e.g., multiple-tasks, multiple scenarios, etc.) and identifies a unified policy over all MDPs. As such, the planning system 170 may solve the optimal policy through $$\pi^*(s)=\underset{\pi}{\operatorname{argmax}}\mathbb{E}\left[\sum_{\tau\in\mathcal{T}}\sum_{t=0}^{\infty}\gamma^t r_\tau(s_t, a_t)\,\middle|\, s_0, \pi\right], \quad \text{Equation (2)}$$

where $\mathcal{T}$ is a MDP set. The planning system 170 can generalize the RL across MDPs that originate from a single task, such as eco-Lagrangian control, using contextual MDP (cMDP). Regarding details, cMDP expands upon a MDP framework by incorporating context that parameterizes environmental variations encountered within a task policy, such as changes in lane lengths at different intersections, atypical factors in eco-Lagrangian control, and so on. Mathematically, cMDP can be represented as $\mathcal{M}=\langle \mathcal{S}, \mathcal{A}, \mathcal{C}, p_c, r_c, \rho_c, \gamma\mathcal{A}$ that involves a context space $\mathcal{C}$, an action space A, and a state space S. Unlike MDP, the transition dynamics $p_c$, reward structure $r_c$, and initial state distribution $\rho_c$ adapt and vary according to the specific context $c\in\mathcal{C}$. In certain respects, a cMDP $\mathcal{M}$ may define a MDP collection that individually differ according to contextual factors represented by $\mathcal{C}$, such that $\mathcal{M}=\{M_c\}_{c\sim}\mathcal{C}$.

Additionally, the planning system 170 solving a given cMDP can implicate a problem of algorithmic generalization within a task policy or task. In other words, the planning system 170 searches to find a policy that performs well on the MDPs within the cMDP. The generalization can be stated as follows, where the goal is to find a unified policy $\pi^*(\cdot)$ that performs well on all $M_c\in\mathcal{M}$:

$$\pi^*(s)=\underset{\pi}{\operatorname{argmax}}\mathbb{E}\left[\sum_{c\in C}\sum_{t=0}^{\infty}\gamma^t r_c(s_t, a_t)\,\middle|\, s_0, \pi\right]. \quad \text{Equation (3)}$$

The MRTL 520 framework can readily solve problems associated with cMDPs. Here, the contexts define the different tasks and align with a specific context $c\in\mathcal{C}$ in Equation (3) corresponding to a task or MDP $\tau\in\mathcal{T}$ in Equation (2).

Referring still to FIG. 5, the MTL 510 may have a unified policy for handling a MDP within the cMDP individually while MRTL decomposes a MDP family within a cMDP into solvable segments that increase computational efficiency and reduce complexity. Here, the segments are governed by the generic policy 310 and residual components by the error reduction 330 involving RL with one or more controls. For example, the planning system 170 trains a task policy by segmenting vehicle actions at an intersection forming a set into a first task for the generic policy 310 and a second task for the residual functions. In this case, the residual functions correct the suboptimality of the generic policy 310 with the second task that has residual components for the intersection. Furthermore, the MDP factors multiple agents and specific traffic scenarios that train the task policy and the second task augments the generic policy 310. As previously explained, the planning system 170 can also learn an intermediate policy for the generic policy 310 associated with the control model upon safety metrics (e.g., stopping distance) being unsatisfied for increasing accuracy. The intermediate policy may factor lane geometries about the intersection. Accordingly, the planning system 170 incorporates a superposition of the two controls with an intermediate policy as needed and generates a task leading to improved training and performance.

In various implementations, the planning system 170 implements cMDP with eco-Lagrangian control at signalized intersections. For eco-Lagrangian control, systems can rely on AVs as Lagrangian actuators for traffic control rather than actuators having fixed-location (e.g., traffic signals) by influencing human-driven vehicles through mimicking vehicle dynamics to reduce emissions (e.g., mitigate stop-and-go). Here, lane lengths, speed limits, lane count, vehicle inflow rates, timings of traffic signals (e.g., green light, red light, etc.) are parameters. These parameters collectively shape diverse contexts within the cMDP for eco-Lagrangian control involving different signalized intersections having varying geometries, traffic flows, and so on. For example, the planning system 170 identifies a control policy that is unified for AVs and adeptly curbs emissions at fleet level across signalized intersections for eco-Lagrangian cMDP. MDPs within a cMDP can involve single-agent and multi-agent configurations. However, eco-Lagrangian control concerns the multi-agent paradigm as coordination and interaction between AVs can reduce emissions in an area having human-driven vehicles while overcoming partial observability. The planning system 170 solves this problem while maintaining or minimizing impact on travel times.

Moreover, given an instantaneous emission model $E(\cdot)$, the planning system 170 identifies a control policy that is unified for AVs and minimizes the objective in Equation (4):

$$\pi^*=\underset{\pi}{\operatorname{argmax}}\mathbb{E}\left[\sum_{c\in C}\sum_{i=1}^{n}\int_0^{T_i}E(a_i(t), v_i(t))dt+T_i\right]. \quad \text{Equation (4)}$$

Here, n represents the total number of vehicles that include AVs and human-driven vehicles. $T_i$ denotes travel time of vehicle i, and $v_i(t)$ and $\alpha_i(t)$ denote the speed and acceleration at time t, respectively. In addition, $\mathcal{C}$ denotes the context space that factors a set of signalized intersections.

In one approach, the MRTL 520 further solves cMDPs by addressing the complexity of combining multiple MDPs within a complete framework for learning. Here, the complete framework includes eco-Lagrangian control and other control models that improve efficiency and decrease emissions. In various implementations, the planning system 170 training MDPs concurrently encounters competition for the limited capacity of the learning agent, thereby causing difficulties with finding a suitable trade-off between MDP-specific and shared knowledge. Additionally, the MDP dynamics may vary significantly that causes difficulties for a control model to adapt and generalize robustly. Furthermore, unsafe interference from MDPs poses an obstacle to achieving generalization and effectively solving the cMDP. For example, unsafe interference involves learning new MDPs that disrupt the performance of previously learned MDPs. Therefore, the planning system 170 trains policies with a generic framework through the MRTL 520 to enhance the algorithmic generalization of RL, thereby solving cMDPs robustly.

As previously explained, the MRTL 520 unifies a learning approach and harnesses the synergy between the MTL 510 and learning residual policies. In one approach, the MRTL 520 augments a given generic policy, which exhibits average performance across various MDPs in a cMDP, through learning residuals on top of the generic policy. These residuals correct suboptimalities within the generic policy 310. For example, eco-Lagrangian control at signalized intersections has an overall reward to reduce AV emissions defined as $r=r_\alpha+r_b$. Initially, $r_\alpha$ represents the reward obtained when the AV glides during red traffic signals that can reduce emissions. The variable $r_b$ represents potential rewards achievable by the AV through dynamically adjusting gliding for a driving environment, such as adapting to other vehicle maneuvers. The planning system 170 factoring these rewards for a control model may be difficult due to model dynamics that are complex. However, the planning system 170 training policies to acquire $r_b$ is achievable through employing a generic policy that identifies $r_\alpha$ while the learning approach captures the remaining benefit $r_b$. As such, the MRTL 520 augments a given generic policy $\pi_n:\mathcal{S}\rightarrow\mathcal{A}$ by learning residuals on top. In particular, the planning system 170 trains a residual policy $\pi_r:\mathcal{S}\rightarrow\mathcal{A}$ by learning a residual function $f_r(s):\mathcal{S}\rightarrow\mathcal{A}$ (e.g., a NN) such that, $$\pi_r(s\mid c)=\pi_n(s\mid c)+f_r(s\mid c) \qquad \text{Equation (5)}$$

where $s\in\mathcal{S}$ and $c\in\mathcal{C}$. In one approach, the residual function $f_r(s)$ is learned with a NN where rewards adjust learning parameters. Furthermore, using the $\nabla$ gradient for $\nabla\pi_r(s)=\nabla f_r(s)$ means that the gradient of the $\pi_r(s)$ is uncoupled with the $\pi_n(s)$. This allows flexibility and compatibility for the generic policy 310 with the MRTL 520 framework for training a control model.

When training multi-residual policies, the planning system 170 may initially set the error reduction 330 layer to zero ensuring that the residuals start at zero. This prevents the residuals from adversely affecting the performance of the generic policy 310, especially when having sufficient optimality. Additionally, a pre-training phase having a critic spanning multiple iterations helps the critic increasingly understand the generic policy 310. In this way, the planning system 170 generates meaningful estimates instead of producing random values initially during training.

In addition, the learning objectives of the residual function $f_r(\cdot)$ may be contingent upon the specific characteristics of an MDP and generic policy $\pi_n$. In certain MDPs, the generic policy 310 serves as an initial reference point and provides minimum performance. In these cases, the generic policy 310 guides the exploration for learning the residual function associated with the error reduction 330. On the other hand, the residuals can fine-tune the generic policy 310 as the policy approaches optimal performance.

Regarding testing the hierarchical arrangement 300, the planning system 170 can factor the features: lane length, vehicle inflow, speed limit, phase time of green signals, and phase time of red signals associated with actual scenarios. As the generic policy 310 of the MRTL 520 framework, the planning system 170 can invoke a heuristic algorithm. For example, Algorithm 1 is a generic policy 310 for eco-Lagrangian control that can involve multi-agents around an intersection. In one approach, Algorithm 1 factors multi-agents that disrupt the glide through the intersection with MRTL 520.

Algorithm 1:
1: procedure GLIDE OR KEEP SPEED (vehicle speed v(t), vehicle distance to intersection d(t), traffic signal timing plan T and green light duration $T_g$)
2: Calculate time to intersection $T_I\leftarrow\frac{d(t)}{v(t)}$
3: Calculate time to green light $T_G$ from T
4: Calculate time to end green light $T_E\leftarrow T_G+T_g$
5: if $T_G\le T_I\le T_E$ then
6: Target speed $v_T\leftarrow v(t)$
7: else if $T_G\ge T_I$ then
8: Calculate target speed based on gliding principle
9: $v_t\leftarrow\frac{d(t)}{T_G}$
10: else
11: Target speed $v_T\leftarrow v_{IDM}$
12: return $v_t$
13: end procedure Algorithm 1 avoids idling that increases emissions. Furthermore, Algorithm 1 checks if the vehicle 100 can pass the intersection when traveling at the current speed. If yes, the generic policy maintains the current speed (lines 5 and 6). If the time remaining to reach the intersection is less than the time until the traffic light turns green, the generic policy initiates a gliding maneuver. This ensures that the vehicle arrives at the intersection when the light transitions to green (lines 7, 8, and 9). In cases where neither of these conditions is satisfied, the policy defaults to a driving approach that is human-like. Accordingly, the planning system 170 can train the generic policy 310 for eco-Lagrangian control using residual policies to efficiently maneuver an intersection involving multiple-agents.

Figure 6:
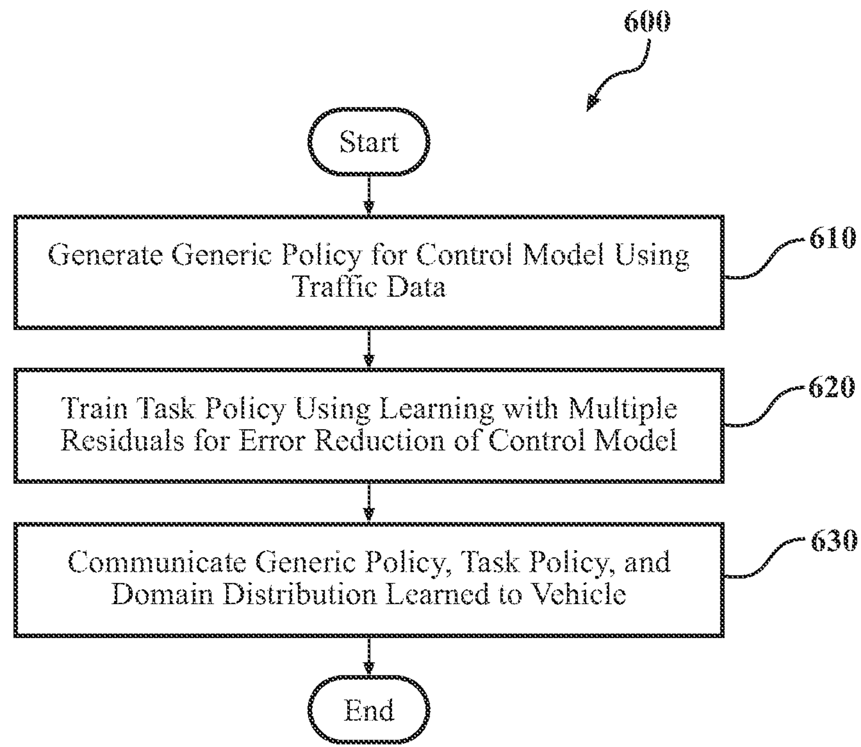
FIG. 6 illustrates one embodiment of a method that is associated with training a task policy for reducing errors of a generic policy associated with the control model.

Now turning to FIG. 6, a flowchart of a method 600 that is associated with an AV navigating through traffic with a control model trained using residual policies for reducing error is illustrated. Method 600 will be discussed from the perspective of the planning system 170 of FIGS. 1 and 2. While method 600 is discussed in combination with the planning system 170, it should be appreciated that the method 600 is not limited to being implemented within the planning system 170 but is instead one example of a system that may implement the method 600.

At 610, the planning system 170 generates a generic policy for a control model using traffic data associated with AVs. For example, the vehicle 100 implements the control model to navigate an intersection having multiple AVs and human-driven vehicles. Here, a policy may be a function accepting an input and outputting an optimal action (e.g., acceleration, maneuver, braking, etc.). As such, the generic policy applies to general scenarios for navigating a road, highway, an intersection, and so on. As previously explained, the control model may be any one of a MPC model, a NN, a data-driven model, an ACC model, a heuristic control, an eco-Lagrangian control model, and so on that outputs motion commands as navigation actions for the vehicle 100. In one approach, the generic policy is a function that outputs acceleration and speed for basic tasks by the vehicle 100 at the intersection. The generic policy may forego factoring parameters from the traffic data when the performance metrics for navigation actions are satisfied. Otherwise, the generic policy can demand further training for navigation actions that are suboptimal or underperform metrics when handling general scenarios with increased complexity.

At 620, the planning system 170 and the policy module 230 train a task policy using learning with multiple residuals for error reduction of the control model. Here, the planning system 170 trains the task policy with RL of residual functions that reduces error of the generic policy. These residuals address and correct suboptimalities within the generic policy for control models, such as eco-Lagrangian control that foregoes factoring dynamics associated with traffic circles. Unlike the generic policy, the residual functions may factor parameters about multiple agents, traffic scenarios that are specific, and atypical traffic. In one approach, the planning system 170 invokes MRTL that decomposes a MDP family within a cMDP into solvable segments associated with tasks for atypical traffic having multiple agents, thereby increasing efficiency. The generic policy governs the segments while a layer for error reduction handles residuals as two controls. In another approach, the planning system 170 trains a task policy with MRTL by segmenting vehicle actions at an intersection forming a set into a first task for the generic policy and a second task for the residual functions. In this way, the residual functions correct the suboptimality of the generic policy with the second task that has residual components for the intersection while identifying the generic policy.

Moreover, the planning system 170 learns an intermediate policy for the generic policy associated with the control model for increasing accuracy when safety metrics for the generic policy are unsatisfied. Here, the intermediate policy factors certain lane geometries about the intersection before policy training for error reduction, such as training associated with atypical traffic. Accordingly, the planning system 170 can compute a complete task for the vehicle 100 using the control model through a superposition with the task policy and the generic policy inputs that improves AV maneuvers and traffic efficiency.

At 630, the planning system 170 communicates the generic policy, the task policy, and domain distribution learned to the vehicle 100. Here, the planning system 170 may learn the domain distribution by comparing simulated data with the traffic data, thereby closing gaps about actual environments after training. In other words, the planning system 170 adapts the domain using actual and simulation worlds by comparing distributions. In particular, the comparison involves calculations that reduce mismatches and discrepancies about road geometries, operator behavior, and so on. Accordingly, the planning system 170 invokes MRTL that generalizes RL computations for efficiency while improving the accuracy of generic policies associated with the control model through residual functions.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, programmable read-only memory (PROM), erasable programmable read-only memory (EPROM), electrically erasable programmable read-only memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the planning system 170, and/or the automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the movement of the vehicle 100. The processor(s) 110, the planning system 170, and/or the automated driving module(s) 160 may control some or all of the vehicle systems 140 and, thus, may be partially or fully autonomous as defined by the society of automotive engineers (SAE) levels 0 to 5.

The processor(s) 110, the planning system 170, and/or the automated driving module(s) 160 can be operatively connected to communicate with the various vehicle systems 140 and/or individual components thereof. For example, the processor(s) 110, the planning system 170, and/or the automated driving module(s) 160 can be in communication to send and/or receive information from the various vehicle systems 140 to control the movement of the vehicle 100. The processor(s) 110, the planning system 170, and/or the automated driving module(s) 160 may control some or all of the vehicle systems 140.

The processor(s) 110, the planning system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the planning system 170, and/or the automated driving module(s) 160 can control the direction and/or speed of the vehicle 100. The processor(s) 110, the planning system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the planning system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 260. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A planning system, comprising:

a memory storing instructions that, when executed by a processor, cause the processor to:

generate a generic policy for a control model to navigate a road having multiple agents with traffic data, the generic policy applying to general traffic scenarios associated with the road;

train a task policy by a reinforcement learning model learning residual functions that reduce errors of the generic policy using a neural network, the residual functions factoring parameters about the multiple agents and specific traffic scenarios and the task policy includes a decision task with segmented actions on the road having different tasks for the generic policy and the residual functions;

learn an intermediate policy for the generic policy used by the control model associated with an unmet stopping distance on the road between the multiple agents; and communicate the generic policy, the task policy for error reduction, and a domain distribution learned for a lane geometry associated with the road by comparing simulated data with the traffic data to a vehicle.

2. The planning system of claim 1, wherein the instructions to train the task policy further include instructions to learn the task policy using a Markov decision process (MDP) for the segmented actions that are a set into a first task for the generic policy and a second task for the residual functions, and the MDP factoring the multiple agents and the specific traffic scenarios that train the task policy and the second task augments the generic policy with a third task using a result from the residual functions.

3. The planning system of claim 2 further including instructions, upon safety metrics being unsatisfied for the generic policy, to learn the intermediate policy for the generic policy associated with the control model for increasing accuracy, the intermediate policy factoring the lane geometry about the road.

4. The planning system of claim 2, wherein the residual functions are functions that correct a suboptimality of the generic policy with the second task that has residual components for the road.

5. The planning system of claim 1 further including instructions to compute a complete task of the vehicle using the control model, the complete task being associated with a superposition from the task policy and inputs of the generic policy, and a traffic encounter is a task variation factored by the task policy.

6. The planning system of claim 1, wherein the domain distribution factors differences between operator behavior at a geographic location from the simulated data and the traffic data.

7. The planning system of claim 1, wherein the parameters are one of operator behavior, weather conditions, and signal timing associated with the road.

8. The planning system of claim 1, wherein the generic policy is a function that outputs one of acceleration and speed for the vehicle on the road without factoring the parameters, and the parameters include lane configuration about the road.

9. The planning system of claim 1, wherein the control model is one of a data-driven model, an adaptive cruise control (ACC) model, a model predictive control (MPC) model, and an eco-Lagrangian control model that outputs motion commands for the vehicle.

10. A non-transitory computer-readable medium comprising:

instructions that when executed by a processor cause the processor to:

generate a generic policy for a control model to navigate a road having multiple agents with traffic data, the generic policy applying to general traffic scenarios associated with the road;

train a task policy by a reinforcement learning model learning residual functions of the generic policy using a neural network, the residual functions factoring parameters about the multiple agents and specific traffic scenarios and the task policy includes a decision task with segmented actions on the road having different tasks for the generic policy and the residual functions;

learn an intermediate policy for the generic policy used by the control model associated with an unmet stopping distance on the road between the multiple agents; and communicate the generic policy, the task policy for error reduction, and a domain distribution learned for a lane geometry associated with the road by comparing simulated data with the traffic data to a vehicle.

11. The non-transitory computer-readable medium of claim 10, wherein the instructions to train the task policy further include instructions to learn the task policy using a Markov decision process (MDP) for the segmented actions that are a set into a first task for the generic policy and a second task for the residual functions, and the MDP factoring the multiple agents and the specific traffic scenarios that train the task policy and the second task augments the generic policy with a third task using a result from the residual functions.

12. A method comprising:

generating a generic policy for a control model to navigate a road having multiple agents with traffic data, the generic policy applying to general traffic scenarios associated with the road;

training a task policy by a reinforcement learning model learning residual functions of the generic policy using a neural network, the residual functions factoring parameters about the multiple agents and specific traffic scenarios and the task policy includes a decision task with segmented actions on the road having different tasks for the generic policy and the residual functions;

learning an intermediate policy for the generic policy used by the control model associated with an unmet stopping distance on the road between the multiple agents; and communicating the generic policy, the task policy for error reduction, and a domain distribution learned for a lane geometry associated with the road by comparing simulated data with the traffic data to a vehicle.

13. The method of claim 12, wherein training the task policy further includes:

learning the task policy using a Markov decision process (MDP) for the segmented actions that are a set into a first task for the generic policy and a second task for the residual functions, and the MDP factoring the multiple agents and the specific traffic scenarios for training the task policy and the second task augments the generic policy with a third task using a result from the residual functions.

14. The method of claim 13 further comprising:

upon safety metrics being unsatisfied for the generic policy, learning the intermediate policy for the generic policy associated with the control model for increasing accuracy, the intermediate policy factoring the lane geometry about the road.

15. The method of claim 13, wherein the residual functions are functions that correct a suboptimality of the generic policy with the second task that has residual components for the road.

16. The method of claim 12 further comprising:

computing a complete task of the vehicle using the control model, the complete task being associated with a superposition of the task policy and inputs of the generic policy, and a traffic encounter is a task variation factored by the task policy.

17. The method of claim 12, wherein the domain distribution factors differences between operator behavior at a geographic location from the simulated data and the traffic data.

18. The method of claim 12, wherein the parameters are one of operator behavior, weather conditions, and signal timing associated with the road.

19. The method of claim 12, wherein the generic policy is a function that outputs one of acceleration and speed for the vehicle on the road without factoring the parameters, and the parameters include lane configuration about the road.

20. The method of claim 12, wherein the control model is one of a data-driven model, an adaptive cruise control (ACC) model, a model predictive control (MPC) model, and an eco-Lagrangian control model that outputs motion commands for the vehicle.

* * * * *